United States Patent [19]

Krulik

[11] Patent Number: 5,194,583

[45] Date of Patent: Mar. 16, 1993

[54] METHOD FOR NEUTRALIZING AN ALKALINE SOLUTION OF AN ORGANIC RESIN

[75] Inventor: Gerald A. Krulik, El Toro, Calif.

[73] Assignee: Morton International, Inc., Chicago, Ill.

[21] Appl. No.: 692,101

[22] Filed: Apr. 26, 1991

[51] Int. Cl.$^5$ .............................. C08F 6/06; C08F 6/12
[52] U.S. Cl. .................................. 528/485; 521/40.5; 523/332; 528/488
[58] Field of Search ................ 523/332; 528/485, 488; 521/40.5

[56] References Cited

U.S. PATENT DOCUMENTS

| | | | |
|---|---|---|---|
| 1,173,698 | 2/1916 | Block | 210/723 |
| 3,915,909 | 10/1975 | Schnoring et al. | 528/488 |
| 4,028,238 | 6/1977 | Allan | 210/711 |
| 4,078,129 | 3/1978 | Yamagata et al. | 528/488 |
| 4,238,442 | 12/1980 | Cline et al. | 524/745 |
| 4,336,170 | 6/1982 | Horiiki et al. | 528/488 |
| 4,760,014 | 7/1988 | Wong | 430/399 |
| 4,857,206 | 8/1989 | Choo | 210/709 |

FOREIGN PATENT DOCUMENTS 0071240  2/1983  European Pat. Off. ........... 528/485

Primary Examiner—Paul R. Michl
Assistant Examiner—Andrew E. C. Merriam
Attorney, Agent, or Firm—Robert M. Didrick; Gerald K. White

[57] ABSTRACT

The use of aluminum sulfate to neutralize alkaline solutions yields a gelatinous precipitate. When neutralization of the solution causes other materials to precipitate along with the gel, filtration of the precipitated materials is very difficult because of the gel. When the combination of magnesium sulfate and aluminum sulfate is used as the neutralizing agent for an alkaline stripper solution of a photoresin, the voluminous sludge may be filtered quickly.

4 Claims, No Drawings

METHOD FOR NEUTRALIZING AN ALKALINE SOLUTION OF AN ORGANIC RESIN

BACKGROUND OF THE INVENTION

This invention relates to the treatment and disposal of acidic photoresist resins after development and stripping during manufacture of printed circuit boards and the like. More particularly, it relates to the neutralization of aqueous alkaline solutions of resins which result from such operations. Still more particularly, it relates to the filtration of the voluminous sludge created by the neutralization.

In the preparation of printed circuit boards, a copper-clad substrate is coated with an alkali-soluble photosensitive polymer called a photoresist and the photoresist is exposed image-wise to actinic radiation to further polymerize the exposed areas and make them less soluble. The negative image is the developed on the substrate by dissolving away the non-exposed areas while leaving the less soluble resin in place. The copper that is thus uncovered is removed by an etchant and then the remaining photoresist is stripped from the substrate by another alkaline solution that is suitably hot. The development and stripping of positive photoresists are done in aqueous alkaline solutions in like manner.

The advantages of forming resinous photopolymerizable compositions which can developed in aqueous systems without the need of organic solvents have been recognized as far back as 1956. After several years of attempts by many investigators in the field of photoresist chemistry, Gilano et al disclosed alkali soluble phototresists having a binder comprising a copolymer of styrene or other vinyl monomer and an unsatureated carboxyl-containing monomer in U.S. Pat. No. 3,953,309. The teachings of Gilano et al in the '309 patent are incorporated herein by reference. One of the problems arising from this advance in the art, however, is the disposal of huge volumes of alkaline waste materials which must be neutralized before they may be introduced into sewage treatment plants or into a landfill. Neutralization with an acid would seem to be the most natural and most straightforward way but the resin becomes a sticky precipitate which constantly clogs the systems designed to separate it from the aqueous phase. The use of aluminum sulfate to overcome that problem and produce a particulate, non-sticky precipitate containing the photoresist resin and aluminum hydroxide which may be filtered from the neutral slurry is taught in U.S. Pat. No. 4,587,206, which also is incorporated herein by reference. Although the filtration rate is much better than what had been suffered through before, the volume of the filter cake is so great that the filter press must be opened for removal of the cake with uneconomical frequency. The greater part of this volume is the attributable to the bulky aluminum hydroxide matrix surrounding the particles of solid resin.

The removal of photopolymer resins from spent developer and stripper mixtures without the formation of an unctuous, gumlike sludge may be accomplished by the addition of an acid, a polyvalent salt, and a coagulation aid to the mixtures, according to U.S. Pat. No. 4,760,014. The ratio of acid to polyvalent cation is from 5:1 to 35:1 by weight.

Aluminum sulfate is also taught as a coagulant for sludges in the treatment of municipal waste water in U.S. Pat. No. 4,028,238. The dewatering of such sludges by filtration is taught therein to be extremely difficult and the solids content of the sludge after filtration is said to less than 15% by weight. The solution to the problem, according to the '238 patent, is to add calcium hydroxide to the sludge after the alum treatment and decanting of the supernatant water. The rate of filtration is increased seven-fold and the solids content was markedly increased.

In U.S. Pat. No. 1,173,698, titanium sulfate is used to facilitate the precipitation of aluminum hydroxide which occurs when aluminum sulfate is added as a coagulant to certain water supplies. Titanium hydroxide is also formed and the patentee teaches that it induces a more rapid and more finely divided precipitation of the aluminum hydroxide.

SUMMARY OF THE INVENTION

It is an object of this invention, therefore, to provide a method for the precipitation of an organic resin from an aqueous alkaline solution thereof and a fast filtration of the precipitate from the aqueous solution.

It is a related object of this invention to provide an improved method for the neutralization of a spent alkaline stripper/developer solution of a photoresist resin by the formation of a sludge comprising an insoluble hydroxide and a precipitated resin whereby the filtration of the sludge is fast.

DESCRIPTION OF THE PREFERRED EMBODIMENTS

These and other objects of the invention which will become apparent from the following description are achieved by introducing a mixture of soluble salts of aluminum and magnesium into the alkaline solution of the resin and filtering the resulting sludge.

The soluble salts of aluminum and magnesium are well known to those of ordinary skill in chemistry and are exemplified by the sulfate, nitrate, chloride, acetate, formate, and gluconate. The basic polychloroaluminum sulfate sold by Atochem UK Ltd. is also suitable. The anions of each salt may be the same or different in any given instance.

The method of this invention consists essentially of adding the above-named salts to the spent stripper solution or the like. A more readily filterable precipitate of the mixed hydroxides is obtained without a coagulation aid such as is taught in the '014 patent, but the presence of salts of other metals which have insoluble hydroxides, such as ferrous sulfate, as additives in the mixture of aluminum and magnesium salts is also suitable to the method. The hydrates of each of these salts, such as $MgSO_4.7H_2O$ and $AlCl_3.6H_2O$, may be used.

The ratio of magnesium salt to the aluminum salt may be from about 1:100 to about 100:1, by weight, but a preferred ratio is from about 1:10 to about 5:1. A particularly preferred ratio is from about 1:4 to about 1:1. The neutralization power of the combination is preferably sufficient to reduce the pH of the resin solution to that of a substantially neutral solution, i.e., one having a pH in the range of from about 6.0 to about 7.0. When the ratio of magnesium salt to aluminum salt is very high, it may be necessary to add a small amount of acid to achieve the desired reduction. The use of an acid salt such as sodium bisulfate in an amount equal to or less than the combined weight of the aluminum and magnesium salts is contemplated to augment the neturalizing power of those salts and reduce the amount of insoluble hydroxides.

In the following examples, which illustrate the invention in more detail, a 100 ml sample of a 3% sodium hydroxide solution of a photoresist resin containing 40 mil-sq ft of Dynachem's LAMINAR ® HG dry film per gallon is neutralized by the addition, in the given ratios, of a mixture of $MgSO_4.7H_2O$ and, except where noted, a technical grade of aluminum sulfate having an average of 14 moles of water of hydration and about 2% by weight of ferrous sulfate. The salts were dissolved in water to give a solution of the mixed salts having the recited concentration. A 100 ml aliquot of the treated stripper is filtered with the aid of vacuum in each case.

EXAMPLE I

The ratio of magnesium salt to aluminum salt was 1:100 by weight and the concentration of total salts was 240 g/l. The salt solution was added to the stripper solution to reduce the pH to 6.5±0.5. Upon pouring the neutralized solution and the solids suspended therein into a Nalgene Type A filter kit having 0.45 micron apertures, 48 mls of filtrate was recovered in 10 minutes.

EXAMPLE II

Here, the ratio of magnesium salt to aluminum salt was 1 and the total concentration of salts was 120 g/l. A pH of 6.5±0.5 was obtained upon the addition of the salt solution. A filter funnel having a diameter of 11 cm was used and the filtrate of 86 mls passed through the filter in 5 minutes.

EXAMPLE III

The ratio of magnesium salt to aluminum salt was 1:3 and the total concentration of salts was 120 g/l. A pH of 6.5±0.5 was obtained upon the addition of the salt solution. Filtration of the neutralized stripper through the 11 cm funnel was essentially complete in 2.5 minutes with the recovery of 92 mls of filtrate.

EXAMPLE IV

When a mixture containing 240 g/l of the sulfates of magnesium and aluminum at a ratio 100 parts of magnesium salt to 1 part of aluminum salt was used and the initial pH of the stripper solution was 12.59, the pH could be reduced to only 9.6. A 50% solution of sulfuric acid was added to reduce the pH further to 6.65. The amount of filtrate in 10 minutes when the neutralized solution was poured into a Type A filter kit having 0.45 micron apertures was 30 mls.

EXAMPLE V

Reagent grade aluminum sulfate octadecahydrate and magnesium sulfate septahydrate were dissolved in water to make a solution containing 90 g/l and 30 g/l, respectively, of the salts. To neutralize 75 mls of a 2% sodium hydroxide stripper solution of the Laminar HG photoresin having a pH of 13.92, 54 mls of the mixed salt solution was used. Filtration of the slurry of solid resin and mixed hydroxides was very fast.

EXAMPLE VI

The general procedure of Example II is followed, except that an alkaline developer solution containing a polymeric binder and photo-polymerizable monomers is treated instead of the stripper solution. Satisfactory results are obtained.

COMPARATIVE EXAMPLE A

When 71 mls of aluminum sulfate solution containing 1 lb of the salt per gallon was used to neutralize the same stripper solution as in Examples I–IV above and a 100 ml aliquot was poured into the Type A, 0.45 micron filter, 43 mls of the filtrate passed through the filter in 10 minutes.

COMPARATIVE EXAMPLE B

A $MgSO_4.7H_2O$ solution at a concentration of 120 g/l was used to treat 100 mls of the same stripper solution. After the addition of 400 mls of this solution, the pH was reduced to only 9.87. A second solution of that salt containing 300 g/l was able to reduce the pH of 100 mls of the stripper to only 9.77 upon the addition of 500 mls. The addition of 900 mls of a third solution containing 600 g/l of the salt to 100 mls of the stripper reduced the pH to 9.07 and filtration of this 1000 mls of treated stripper using the Type A, 0.45 micron filter kit was attempted but the filter kit plugged up.

COMPARATIVE EXAMPLE C

The addition of 51.6 g of a 5% solution of sulfuric acid to the 120 g/l magnesium sulfate solution of Comparative Example B and the addition, in turn, of the acidified sulfate solution to the stripper solution to reduce the pH to 6.5 gave a slurry which, upon filtration of a 100 ml aliquot through the Type A filter kit for 10 minutes, yielded only 4 mls of filtrate.

Although the above working examples are specific to the treatment of resins used in making printed circuit boards, it will be understood by those of ordinary skill in the art of resin chemistry that other organic resins that are soluble in aqueous alkaline solutions may be precipitated from such solutions and recovered by the method of this invention.

The subject matter claimed is:

1. A method for separating an acidic organic resin from an aqueous alkaline solution of the resin, the method consisting essentially of introducing a mixture of water soluble salts of aluminum and magnesium into the alkaline solution whereby insoluble hydroxides and the resin are co-precipitated, and separating the precipitates from the aqueous solution.
2. The method of claim 1 wherein the ratio of the magnesium salt to the aluminum salt is from about 1:100 to about 100:1 by weight.
3. The method of claim 1 wherein the weight of the aluminum and magnesium salts is the stoichiometric amount for the reduction of the pH of the alkaline solution to from about 6.0 to about 7.0.
4. The method of claim 3 wherein the ratio is from about 1:10 to about 5:1.

* * * * *

UNITED STATES PATENT AND TRADEMARK OFFICE
CERTIFICATE OF CORRECTION

PATENT NO. : 5,194,583
DATED : March 16, 1993
INVENTOR(S) : Gerald A. Krulik

It is certified that error appears in the above-indentified patent and that said Letters Patent is hereby corrected as shown below:

Column 3, line 27, "1" should be ---3:1---.
Column 4, line 60, "claim 3" should be ---claim 2---.

Signed and Sealed this

Twenty-ninth Day of March, 1994

Attest:

BRUCE LEHMAN

*Attesting Officer*  *Commissioner of Patents and Trademarks*